United States Patent [19]
Zimmerman et al.

[11] Patent Number: 5,685,411
[45] Date of Patent: Nov. 11, 1997

[54] ARTICLE CONVEYOR SYSTEM

[75] Inventors: Bruce Zimmerman, Glen Ellyn; George Campise, Jr., Aurora; Charles Styles, Bolingbrook; David Rudzinski, Woodridge, all of Ill.

[73] Assignee: Avtec Industries, Inc., Oswego, Ill.

[21] Appl. No.: 650,792

[22] Filed: May 20, 1996

Related U.S. Application Data

[62] Division of Ser. No. 372,497, Jan. 13, 1995, abandoned.
[51] Int. Cl.$^6$ .................................................. B65G 37/00
[52] U.S. Cl. ........................................................ 198/464.4
[58] Field of Search ............................... 198/323, 464.4, 198/502.1

[56] References Cited

U.S. PATENT DOCUMENTS

| | | | |
|---|---|---|---|
| 2,962,149 | 11/1960 | Hansen | 198/323 |
| 3,233,717 | 2/1966 | Minejiro Jin et al. | 198/323 |
| 4,476,971 | 10/1984 | Schoneweiss | 198/323 |
| 5,009,307 | 4/1991 | Chance et al. | 198/323 X |
| 5,255,771 | 10/1993 | Nurnberg et al. | 198/323 |
| 5,307,918 | 5/1994 | Rivera et al. | 198/323 |

*Primary Examiner*—D. Glenn Dayoan
*Attorney, Agent, or Firm*—Edward D. Gilhooly, Ltd.

[57] ABSTRACT

An article conveying system including a conveyor belt having a plurality of slats movable along a slider bed. A nozzle system directs a water and detergent flush along the water bed beneath the conveyor belt to remove debris. A water tank and scrap basket collect and remove the debris and direct water to a drain. The slats have lower feet which engage a pair of plastic tracks and are removable for cleaning. The system is also provided with an anti-jam device.

8 Claims, 12 Drawing Sheets

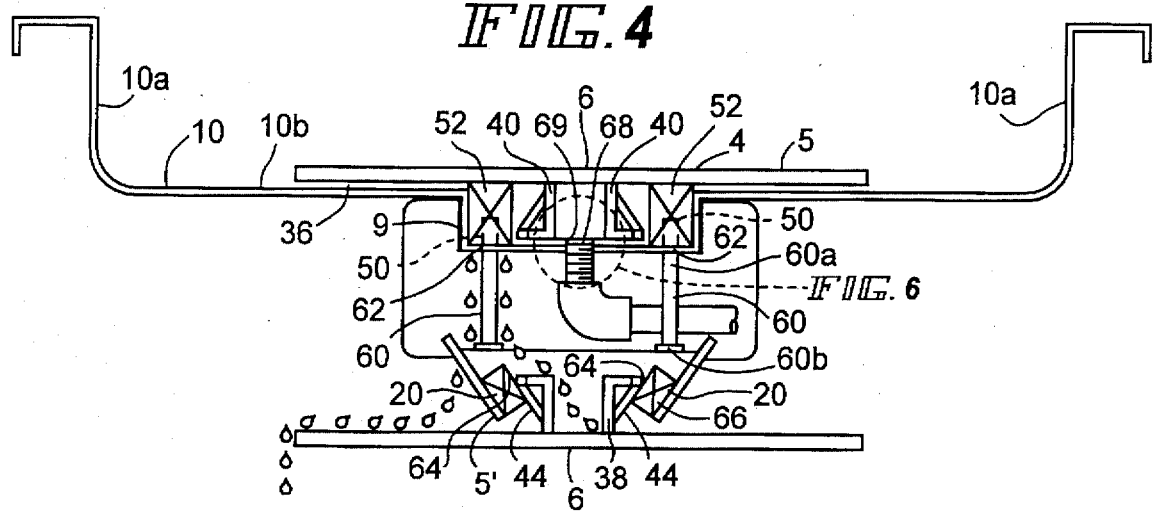
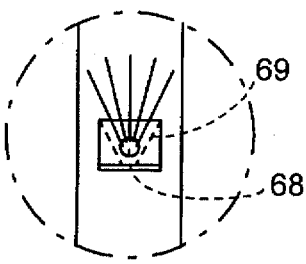
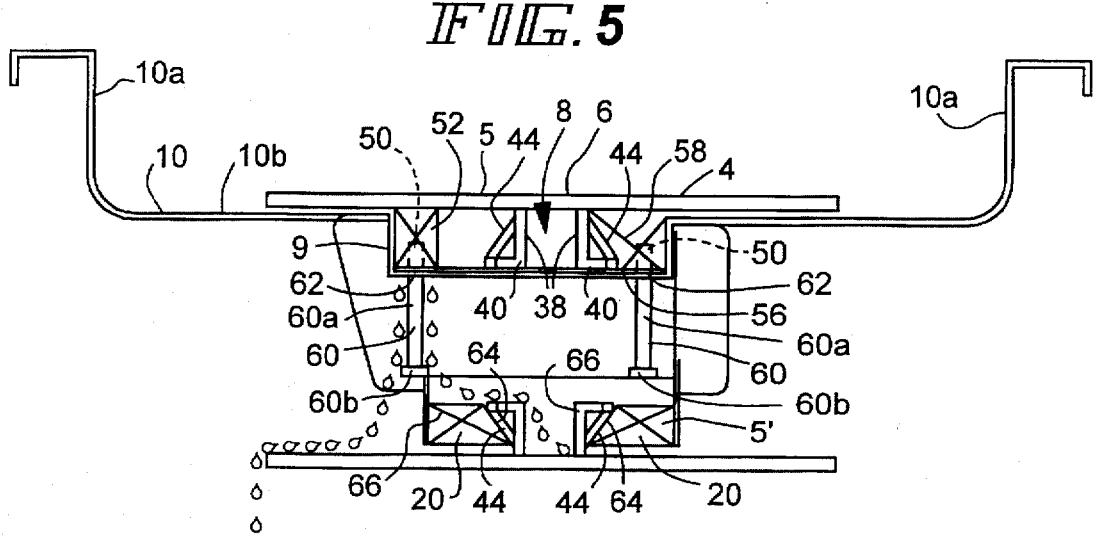

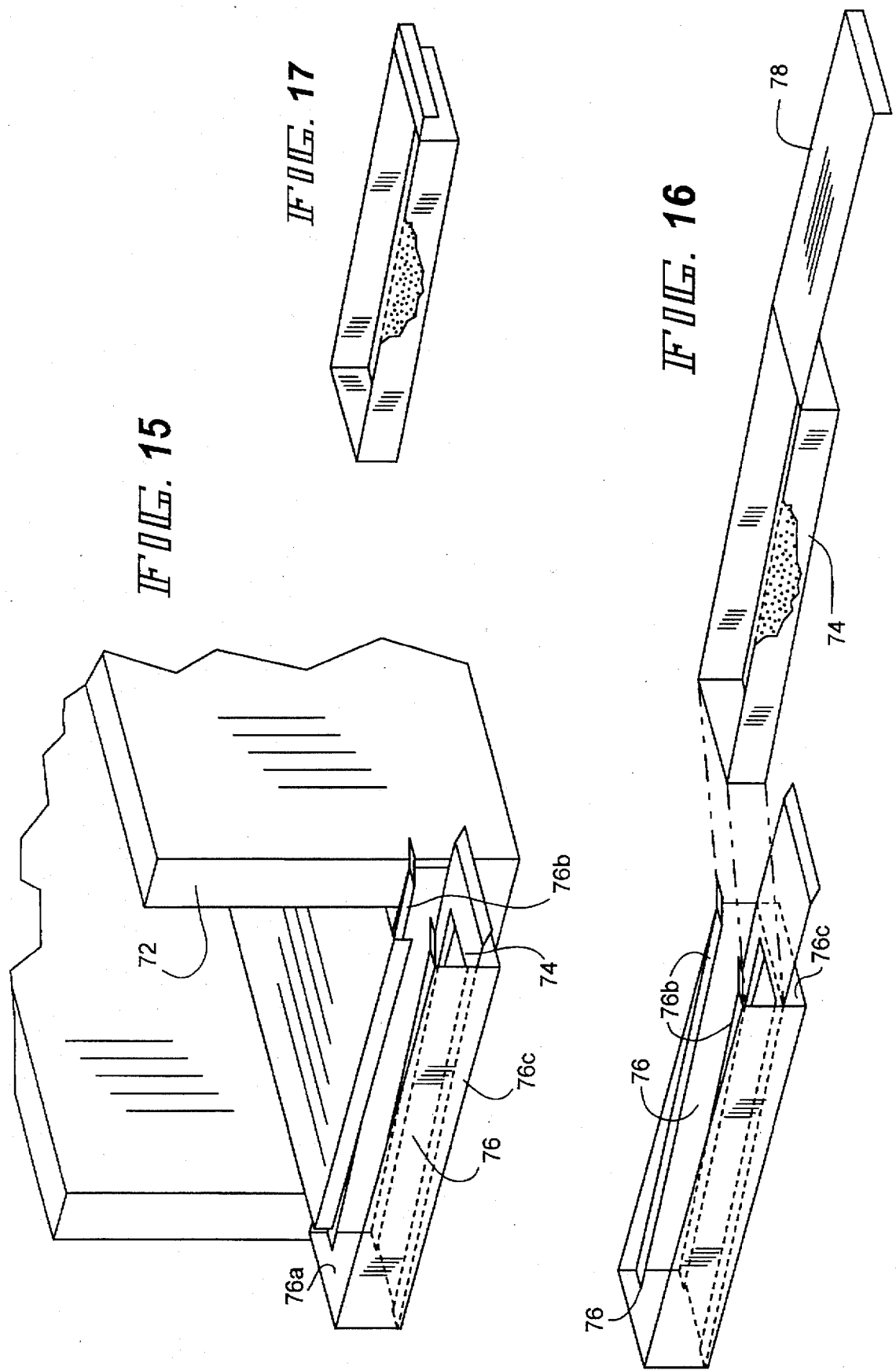

ARTICLE CONVEYOR SYSTEM

This is a divisional of application Ser. No. 08/372,497 filed Jan. 13, 1995 abandoned.

BACKGROUND OF THE INVENTION

1. Field of the Invention

This application is a continuation in part of copending application, Ser. No. 08/304,801 filed on Sep. 12, 1994, entitled Conveyor System. This invention relates to article moving apparatus and more particularly, to an improved conveyor system.

2. Summary of the Prior Art

Conveyors of numerous designs have been used in the past to transport articles from one station to another. Known conveyors have employed endless belts, segmented slats and other elements to move objects along their path of transport. Conveyors are particularly useful in food service applications, specifically to transport dishes, glasses and silverware, individually or on cafeteria trays, from the cafeteria to the dishroom. Food service conveyors are also used to transport dishware, glasses and silverware in standard dish room racks or on the conveyor belt, usually from a scraping table to a dishwashing machine. In some cases, the scraping table may form part of the conveyor to remove excess material before being conveyed to the dishwashing machine. In typical commercial kitchens, dishrooms and cafeterias, it is often necessary for a conveyor to transport trays, dishware and the like for considerable distances, during which the conveyor belt may move along combined linear or curved paths. In such situations, equipment must be reliable and capable of sustaining heavy duty service while maintaining satisfactory sanitary conditions.

One type of a conventional conveyor utilizes a plurality of separate belt slats mounted on an endless chain drive. The slats of the foregoing design are capable of independent motion during movement along curves and usually undergo articulation or separation from the drive sprocket at the slider bed entrance or end of the upper conveyor run. In such systems, it is desirable to remove individual conveyor slats for purposes of cleaning, replacement, repairing and maintenance. It is also desirable to remove the chain and belt assembly for purposes of cleaning. The belt of known conveyors are secured to rails in a manner that makes them difficult to remove for cleaning, particularly along curved paths, while the rails adjacent the belt are fastened and not moveable for cleaning.

Known conveyors are also deficient in circulating adequate water and sanitizing detergent beneath the upper conveyor belt and in the slider bed trough for sufficient removal of debris. In prior systems removal of debris from the slider trough was done manually, while removal of debris from the slat belt was separately accomplished by wash nozzles in the wash tank. Such techniques have failed to provide effective removal of debris. Accordingly, improvements are needed in conveyors systems to provide effective periodic cleaning and flushing of debris from the system during use.

A potentially dangerous hazard also exists in prior conveyor systems at the slider bed entrance. This is the area at which the belt slat engages the sprocket of the conveyor drive and where fingers of individuals and clothing can be caught causing personal injury. Articles, such as silverware and the like, can also get caught to interfere with movement of the conveyor belt and cause system damage which may require major repairs. Current conveyors have not satisfactorily solved the problem of preventing potential injury to personnel and prevent jamups at the slider bed entrance.

As is the case of any machinery undergoing heavy duty use, conveyors require periodic service and replacement of parts. In the past, operative components of the conveyors, such as detergent pumps, motors, low level alarms, electrical elements, drive motors and gears, bearings, controls and the like, are usually situated within a housing in a manner that is not conveniently accessible for service. Such an arrangement of the operative components interferes with serviceability and increases the costs and time for repair or service.

It is, therefore, desirable to provide an improved conveyor system having improved operative features relating to performance, maintenance of cleaned sanitary conditions, safety, and serviceability.

SUMMARY OF THE INVENTION

It is an objective of the invention to provide an improved conveyor system for transporting articles. The conveyor system of the invention is particularly useful in food service applications for delivery of dishware, glasses and silverware, either individually or on trays or dish racks and the like. The conveyor mechanism herein disclosed includes belt slats which are affixed to an endless stainless steel roller chain to create movement along a slider bed. The belt slats move along slide rails and possess an improved design allowing for ready removal from the slide rails for purposes of cleaning, even at curved sections of the upper conveyor path. The design of the slats herein further reduces friction along the slide rail and provides an overall improvement in the performance of the conveyor.

The system of the invention is also provided with an improved flushing capability through which satisfactory sanitary conditions can be maintained during use even with extreme accumulation of debris. The top slider bed is provided with a sanitizing flush to move water and debris along the slider bed through water pressure and in conjunction with the motion of the conveyor chain to flush the material for discharge at a collection point. In addition, a drip pan is disposed below the lower return portion of the conveyor belt and is subjected to a flush in a similar manner as the upper slider bed. As a result of the efficient performance of a top and lower sanitizing flush, the removal of debris trapped on the endless belt is highly effective.

A water tank at the drive end for the upper flush and at tail end for the lower flush of the invention operates in conjunction with the upper and lower flushing systems to direct water into an external scrap basket and out the drain in a manner providing efficient water flow and removal of debris. The drive motor, gear reducer, drive chain sprockets and take up idler of the system are all accessible through one side of a housing for convenient servicing, a capability not found in prior conveyor systems. Serviceability is further enhanced by removing components normally requiring service from the housing to a remote location. Such components as the detergent pump and motor, low level sensor, electrical components, grease fittings, and meters are all positioned at locations easily reached for service. The bearings of each side of the slat belt conveyor are located inside the tank drive housing and are accessible from the top to improve access to these components which require maintenance service and replacement on occasion. Thus, the invention efficiently houses the internal operative components in so that service and maintenance costs and shutdown are minimized.

The dangerous conditions existing at the slider bed entrance where the belt slat engages the sprocket are alleviated in the conveyor system of the invention. The articulating slats are covered by a pivotal plate and are not externally exposed. Such protection reduces the likelihood of silverware, fingers and clothing and the like getting caught. Moreover, the invention includes means to cease operation of the conveyor belt if an object, such as silverware, engages the pivotal plate. Such deactivation of the conveyor system prevents jamup and the need of major repair. The unique design of the anti-jam means herein disclosed allows objects of a predetermined size, such as dish trays or racks, to be pushed past the slider bed entrance without interference with the operation of the system.

BRIEF DESCRIPTION OF THE DRAWINGS

FIG. 4 is an end elevational view, with parts in section, taken along lines 4—4 of FIG. 1;

FIG. 5 is an end elevational view, with parts in section, taken along lines 5—5 of FIG. 1;

FIG. 6 is an enlarged detailed top view of the nozzle of FIG. 4;

FIG. 15 is a perspective side view of the scrap basket and scrap basket holder for use with the drive housing wash tank of FIG. 14;

FIG. 16 is a side perspective view of the scrap basket holder and removable scrap basket of FIG. 15 showing external handle for accessibility where conveyor is behind dishtable;

FIG. 17 is a side perspective view of the scrap basket of FIG. 16 with extension handle;

FIG. 21 is a top partial plan view of the details of the three flush nozzles and manifold used in the drip pan of FIG. 11.

DESCRIPTION OF THE PREFERRED EMBODIMENT

Figure 1:
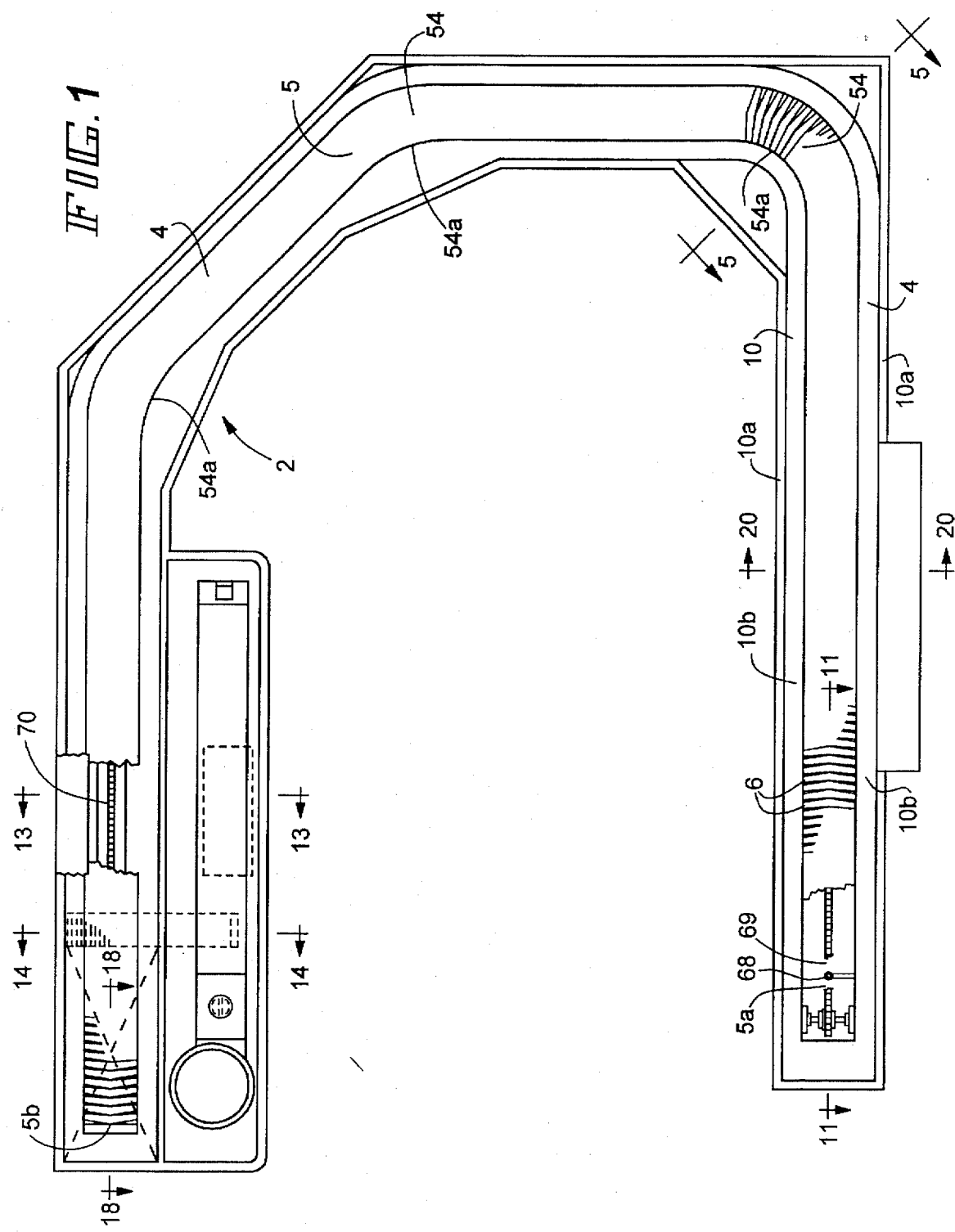
FIG. 1 is a top plan view of the conveyor system of the invention.
Figure 2:
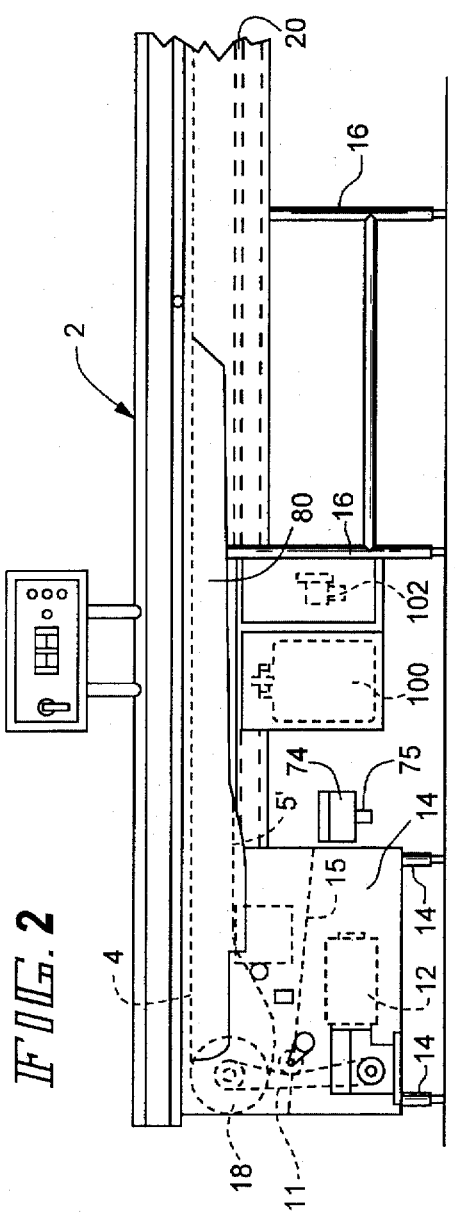
FIG. 2 is a front elevational view of the conveyor system of FIG. 1.
Figure 3:
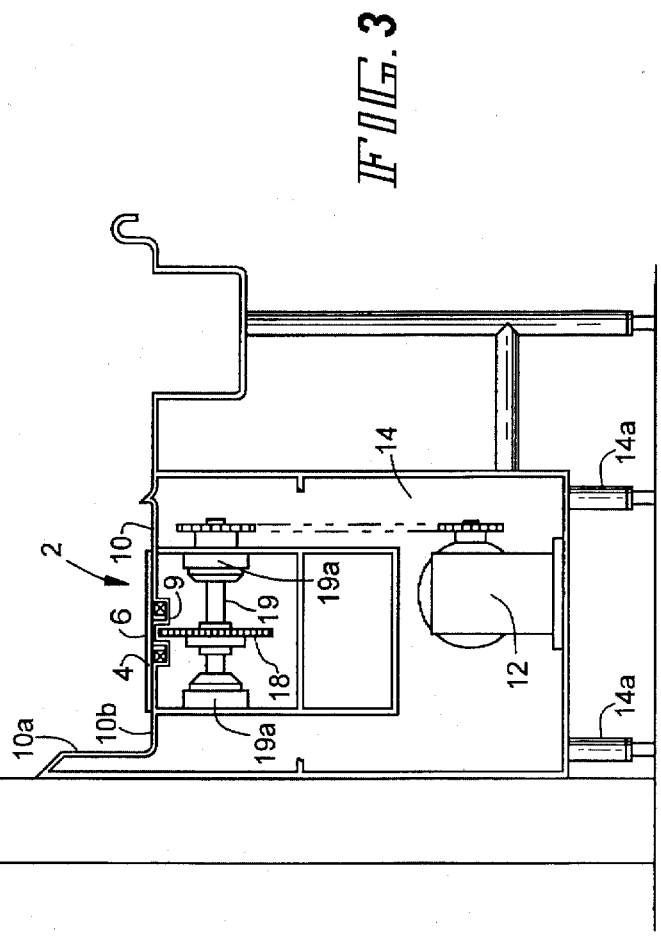
FIG. 3 is an end elevational view, with parts removed, of the conveyor system of FIG. 1.

Referring now to FIGS. 1–3, there is illustrated the improved conveyor system of the invention, generally designated by the reference numeral 2. Although the conveyor system 2 can be used to transport a wide range of articles from one station to another, the conveyor system 2 is particularly useful in food service applications, specifically to transport dishware, glasses and silverware from the cafeteria to the dishroom, and in the dishroom to transport dishware, glasses and silverware on trays or racks from the scrapping table to the dishwashing machine and the like. The conveyor system 2 includes an endless slat belt conveyor 4, which moves along an upper conveyor path 5 from belt exit 5a to slider bed entrance 5b. As seen in FIG. 1, the upper conveyor path 5 extends along straight and curved sections and passes various stations (not shown) as is needed in particular applications. The endless slat belt 4 has a return path 5' from the slider bed entrance 5b and returning to the slider bed exit 5a, as will be more fully described later.

The slat belt conveyor 4 is provided with a plurality of slats 6, which are retained for movement on a driven endless chain 8 (FIGS. 3, 11, 12 and 18). The endless chain 8 has conventional links 8a and moves in a central depressed trough 9 of an elongated metal slider bed 10 that extends along the entire upper conveyor path 5a. The slider bed 10 is formed from stainless steel, aluminum, and the like. The slider bed 10 includes a pair of vertical sides 10a and a flat bed 10b surrounding trough 9 as seen in FIGS. 3 and 4. The slats 6 are disposed for movement in the conveyor path 5 along trough 9 and a portion of the flat slider bed 10b.

As best seen in FIGS. 2–3, 11, and 12, the slat belt conveyor 4 is driven by a drive chain 11 through drive motor 12 and drive sprocket 13. The electric drive motor 12 is positioned beneath the conveyor belt 4 in housing 14 at the slider bed entrance 5b. The housing 14 rests on legs 14a and has vertical walls 14b and a bottom wall 14c. A wash tank enclosure 15 separates the upper portion of housing 14 from the drive components, including electric motor 12. Other legs 16 support the other portion of the conveyor system 2 (FIG. 2). The housing has removable door 17 to provide access to the drive components as needed, particularly if the conveyor is adjacent a wall as shown in FIG. 2. A driven sprocket 18 engages the links 8a of conveyor chain 8 through teeth 18a to move the slat belt conveyor 4. As seen in FIGS. 2 and 3, the driven sprocket 18 is mounted on shaft 19 mounted in bearings 19a at an upper position in housing 14. It should be apparent that the conveyor belt 4 moves from exit 5a to slider bed entrance 5b in conveyor path 5 and beneath the conveyor belt in its conveyor return path 5'. Monorails 20 aid in support of the conveyor belt 4 in the return path as shown in FIGS. 2, 4, 5, and 11.

Figure 7:
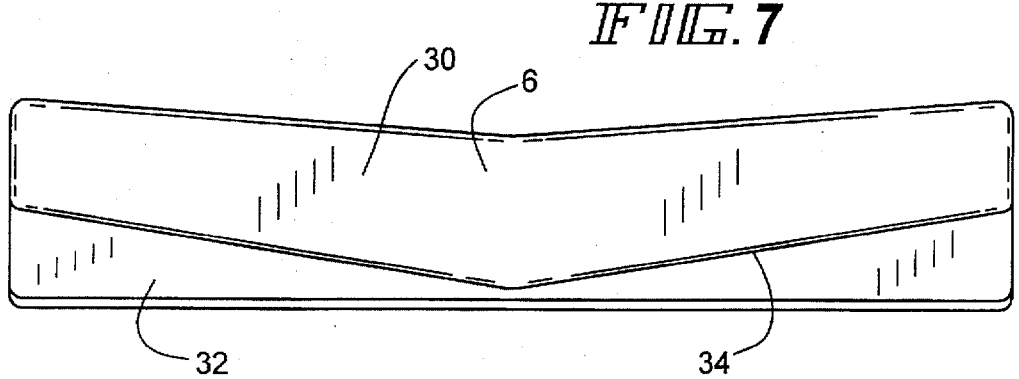
FIG. 7 is a top plan view of a slat of the conveyor system of FIG. 1.
Figure 8:
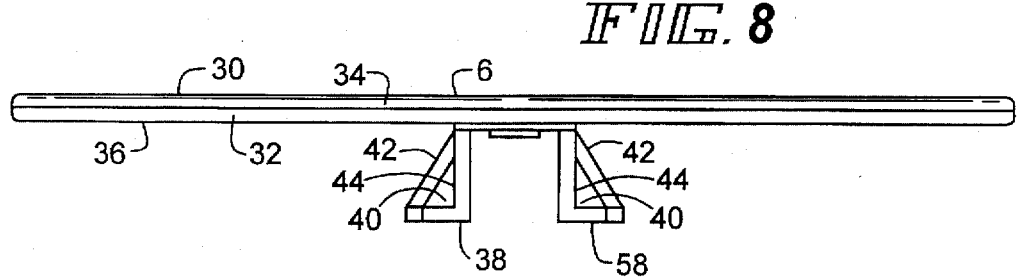
FIG. 8 is a front elevational view of the slat of FIG. 7.
Figure 9:
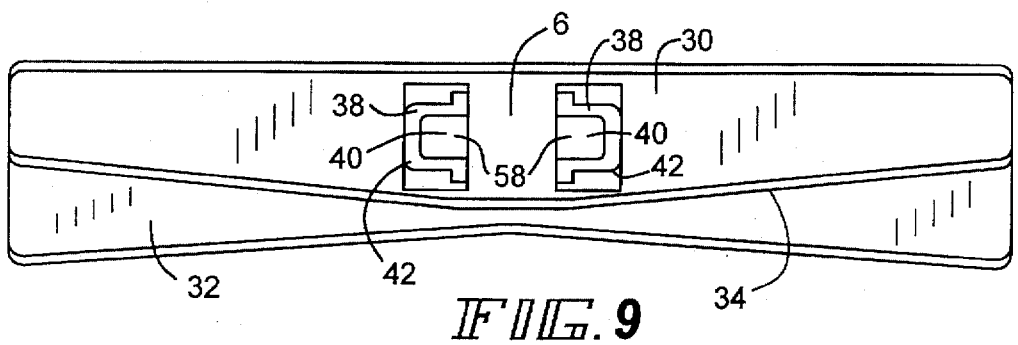
FIG. 9 is a bottom plan view of the slat of FIG. 7.
Figure 10:
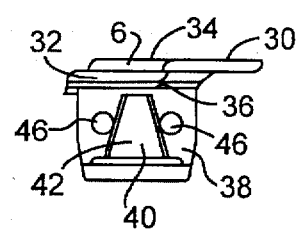
FIG. 10 is a side elevational view of the slat of FIG. 7.
Figure 11:
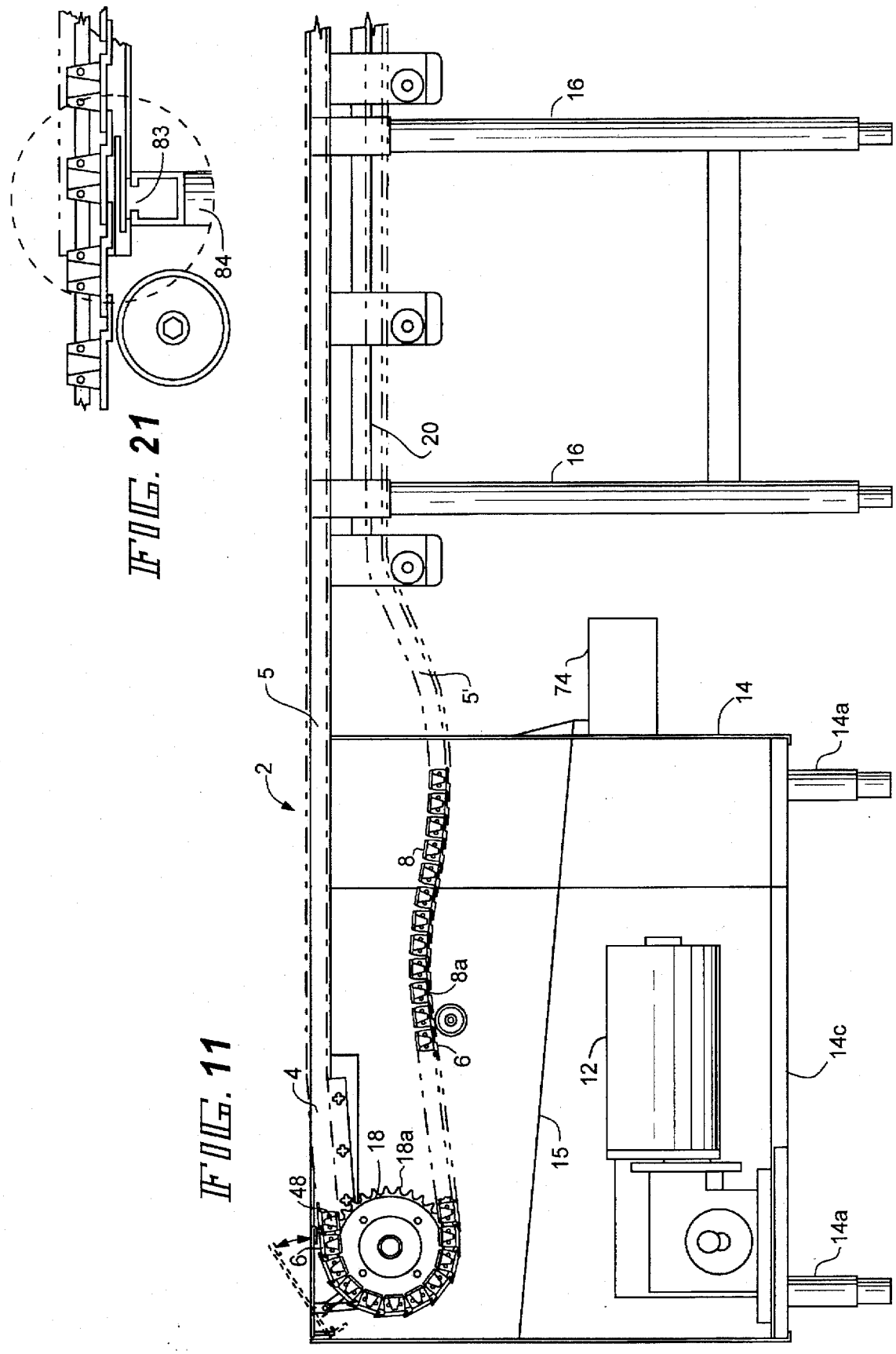
FIG. 11 is a partial elevational view, with parts broken away, showing the drive housing and conveyor belt of the conveyor system of FIG. 1.
Figure 12:
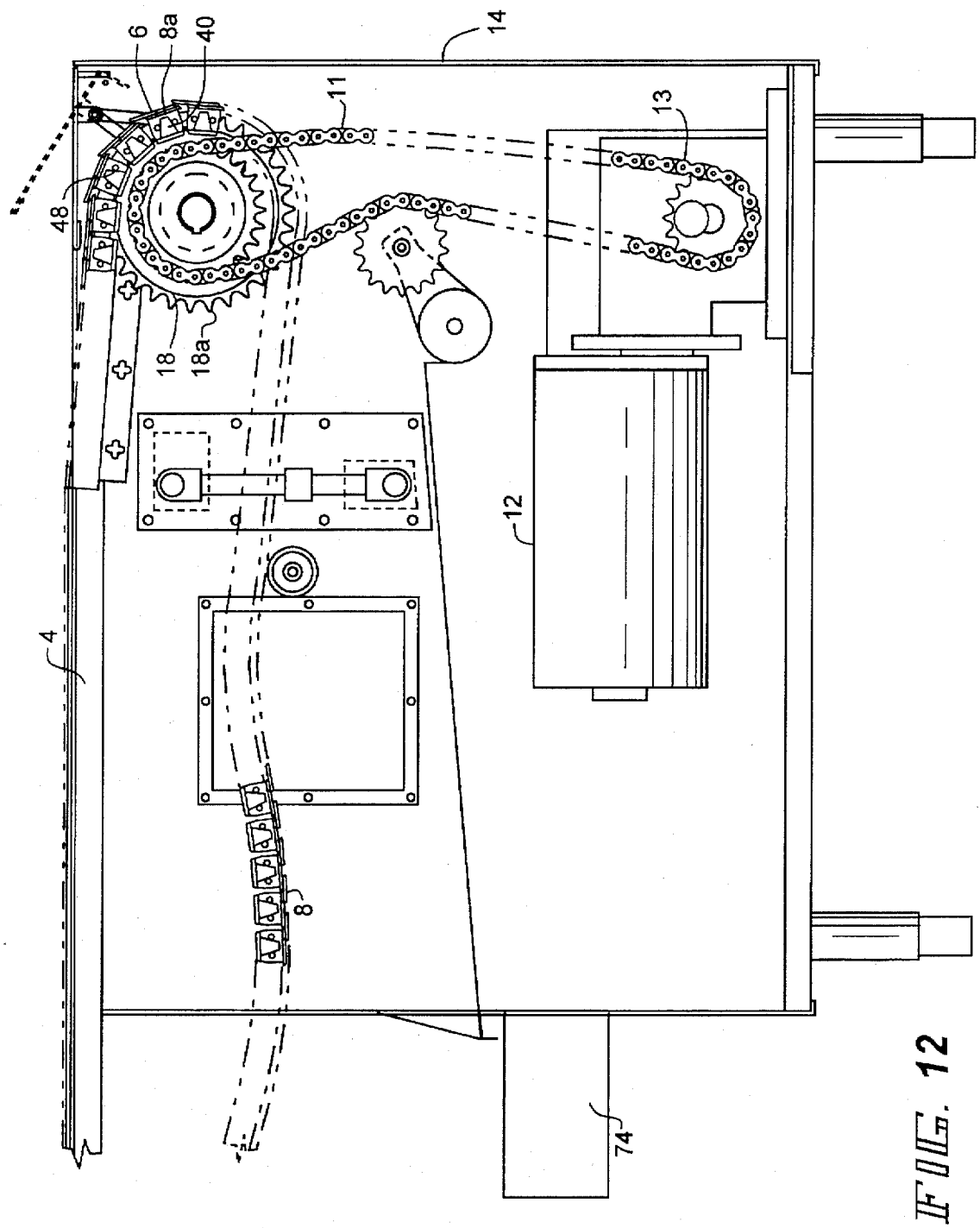
FIG. 12 is a side elevational view of the drive housing and wash tank of the conveyor system of FIG. 1.

In the FIGS. 4, 5, and 7 to 10, the construction of an individual slat 6 of the slat conveyor belt 4 is best illustrated. The slats 6 of the invention are formed as a unitary member from a suitably low frictional material, such as Delrin or polyprophylene. The slats 6 each include a rear upper portion 30 and a lower front portion 32, which form an upper 34 shoulder extending in a swept-back orientation as seen in FIG. 7. The shoulder 34 permits the slats 6 to undergo relative movement along the curves of the upper conveyor path 5a and the lower return path. The lower surface 36 of the slat 6 is flat to engage a portion of slider rails 50. The slats 6 are provided with integral lower feet portions 38 which are in the form of two integral bracket members 40 having a U-shaped configuration from the bottom (FIG. 9) and having an L-shaped configuration (FIG. 8) from the front. An abutment 42 is formed on each outer side of the bracket members 40 and slopes in inwardly from the bottom to the top to create a triangular like surface configuration 44 when viewing the front of the slat in FIG. 8. The lower feet portions 38 include a pair of holes 46 (FIG. 9) to receive the pins 48 of the endless chain 8 to which the slat 6 is attached.

As best seen in FIGS. 4 and 5, the feet portions 38 of the slats 6 are disposed between a pair of spaced slide rail assemblies 50 fabricated from an ultra-high molecular weight polyethylene demonstrating low friction characteristics. The rails 50 in the straight sections of the upper conveyor path 5 have a generally rectangular cross-section 52 and are mounted on each side of slide bed trough 9. The curved sections 54 (FIG. 1) of the slide rails 50 possess a modified configuration on the inner curve 54a in which a side surface 56 confronting the slat feet 38 has an downwardly pacing slope 58 to engage the triangular surface configuration 44 of the slat feet 6 forming a upwardly facing slope as best seen in FIG. 5. Such a corresponding relationship between the side surface 56 of rails 50 and a foot portion 38 creates contact on one side to maintain the slat 6 in place around curves. The design also allows belt assembly 4 to be easily pulled out for cleaning even around curved portions where difficulties exist in the past when removing slats on curves. The hollow portions 58 in bracket members 40 allow easy access for a tool, such as a screwdriver, to be placed between the slat foot and the chain 8 for ease of removing a slat 6 at any top slider point in the conveyor path 5.

A plurality of slide rails 50, in sections of approximately four feet, are affixed end to end in the trough 9 of the slider bed 10 by use of bolts 60 having an excessive length and being in oversized holes 62 to form a continuous pair of rails 50. The excessive length of the bolts 60 with an unthreaded lower portion 60a allows the slide rails 50 to be raised from the slider bed 10 in a captive relationship for ease of cleaning. The enlarged lower end 60b prevents removal of rails 50 from the bed 10. The oversized holes 62 on the bottom of the slider bed 50 allows water to drip as illustrated in FIGS. 4 and 5 to the bottom of the conveyor belt 6 riding in the lower return path 5' on the return monorail 20, roller, or other type of return system during the top slider bed flush to be described later.

As best seen in FIGS. 4, 5, 11, and 12, the monorail slide rails 20 of return path 5' are disposed in corresponding relationship below portions of the upper conveyor path 5. The rails 20 are suitably affixed to the conveyor housing and include sloped upward facing surfaces 64 in the sides 66 confronting triangular portions 44 of the slat feet 38, such that the triangular abutment 42 of the slats 6 are locked in an inverted position on the lower monorail slide rails 20. The lower returning slide rails 20 are also formed from an ultra-high molecular weight polyethylene.

Referring to FIGS. 1, 4, and 6, the top flush nozzle 68 for the slider bed 10 is best illustrated. The top flush nozzle 68 is positioned beneath the slider bed 10 at a location in the vicinity of the slat belt exit 5a at the beginning of the upper conveyor path 5. The nozzle 68 is suitably mounted beneath a port 69 in the slider bed 10 to deliver a sanitizing spray of water and detergent into trough 9 of slider bed 10 beneath the slats 6. Additional nozzles (not shown) may be spaced as needed approximately every 16 to 30 feet.

The flush is delivered by nozzle 68 at predetermined intervals, such as, for 15 to 30 seconds every 15 to 30 minutes or as otherwise required. The pressure of the flush acts to push water and debris along the slider bed 10 in conjunction with the relative movement of the conveyor 4 due to the close proximity of the belt 4 with the pan and acting as a propellant. A trough 70 is provided near the slider bed entrance 5a of the conveyor belt 6 as shown in FIG. 13.

Figure 13:
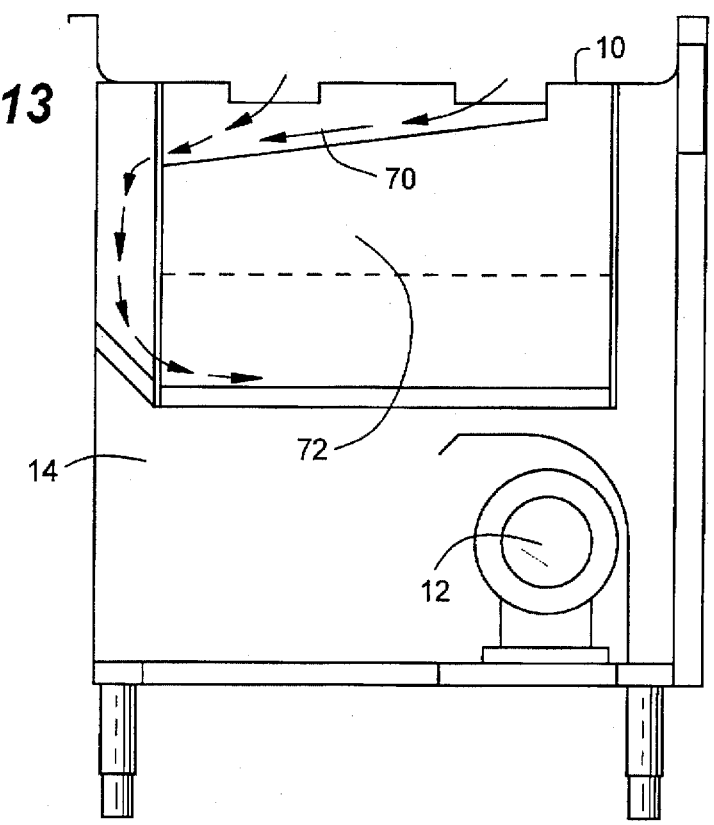
FIG. 13 is an end elevational view, with parts in section, of the drive housing wash tank of the conveyor system taken along lines 13—13 of FIG. 1.
Figure 14:
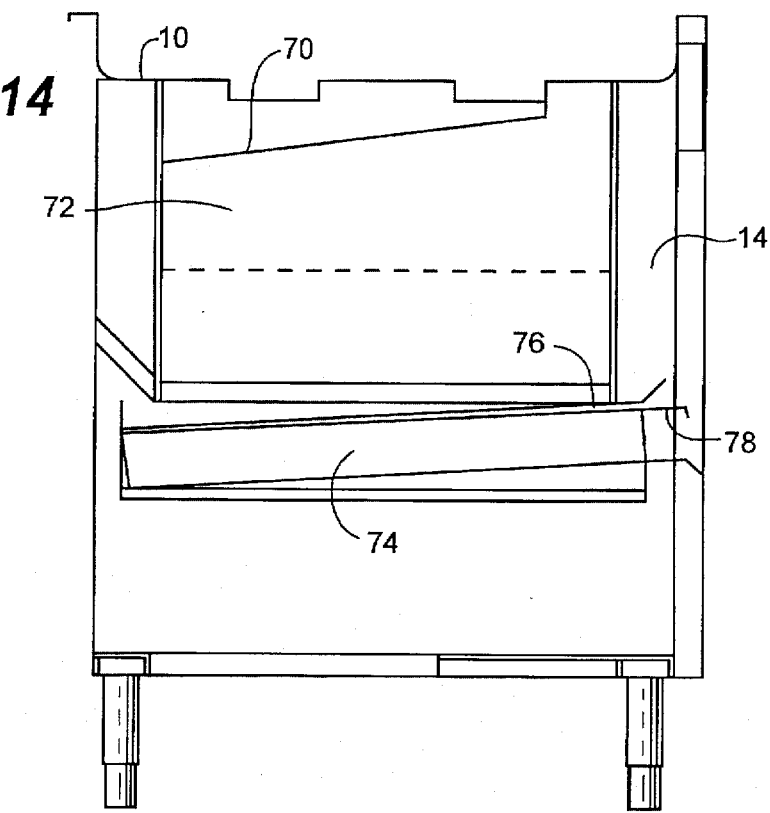
FIG. 14 is an end elevational view, with parts in section, of the drive housing wash tank and catch pan taken along lines 14—14 of FIG. 1.

As seen in FIGS. 13, 14, 15, 16, and 17, the water and debris are directed from the slider bed 10 through trough 70 into the water tank 72. (FIG. 13). The water and debris are then routed from the water tank 72 through an outlet (not shown) to a scrap basket 74, having an open top 74a and perforated bottom 74b, and out the drain 75 (FIG. 2). The scrap basket 74 is slidably mounted in a holder 76 externally of the water tank 72 and is removable therefrom as seen in FIG. 16. The holder 76 includes an open top 76a and a pair of upper flanges 76b. Bottom sections 76c also provides support of the bottom of scrap basket and provides outlet to drain 75. Both upper flanges 76b and lower sections 76c are angularly oriented in relation to the water tank 72. The scrap basket 74 is angularly oriented in sliding relationship on the holder 76 to permit easy removal and to direct debris out of the normal water stream to assure a good water flow and to facilitate removal of debris. The removability of scrap basket allows for easy emptying of debris collected by scrap basket 74. An extension handle 78 is mounted on scrap basket 74. The extension handle 78 permits easy removal of the scrap basket 74 even when the conveyor belt drive and water tank are in an inaccessible location as necessitated by application requirements.

As seen in FIGS. 11, 20, 21, and 22, a bottom drip pan flush is provided in drip pan 80 lying below the conveyor return path 5'. The drip pan 80 having a bottom 80a and upright spaced sides 80b is disposed beneath a substantial portion of the conveyor return path 5. A sanitizing spray of water and detergent is delivered upward through drip pan 80 through three nozzles 82 (FIGS. 21 and 22) disposed in fluid communication with a manifold 83. A water inlet 84 is coupled to the manifold 83 to deliver water and detergent to manifold 83 under pressure. The nozzles 82 deliver the flushing solution into the drip pan 80 under pressure to push water and debris along the drip pan 80 to the tail end or bed exit of the conveyor. The drip pan 80 receives any debris not removed by the top flush. The water spray from nozzles 82 carries the debris in the drip pan 80 to the bed tail end for collection in a water tank and scrap basket (not shown) of similar design as water tank 15 and scrap basket 74 as previously described.

Figure 18:
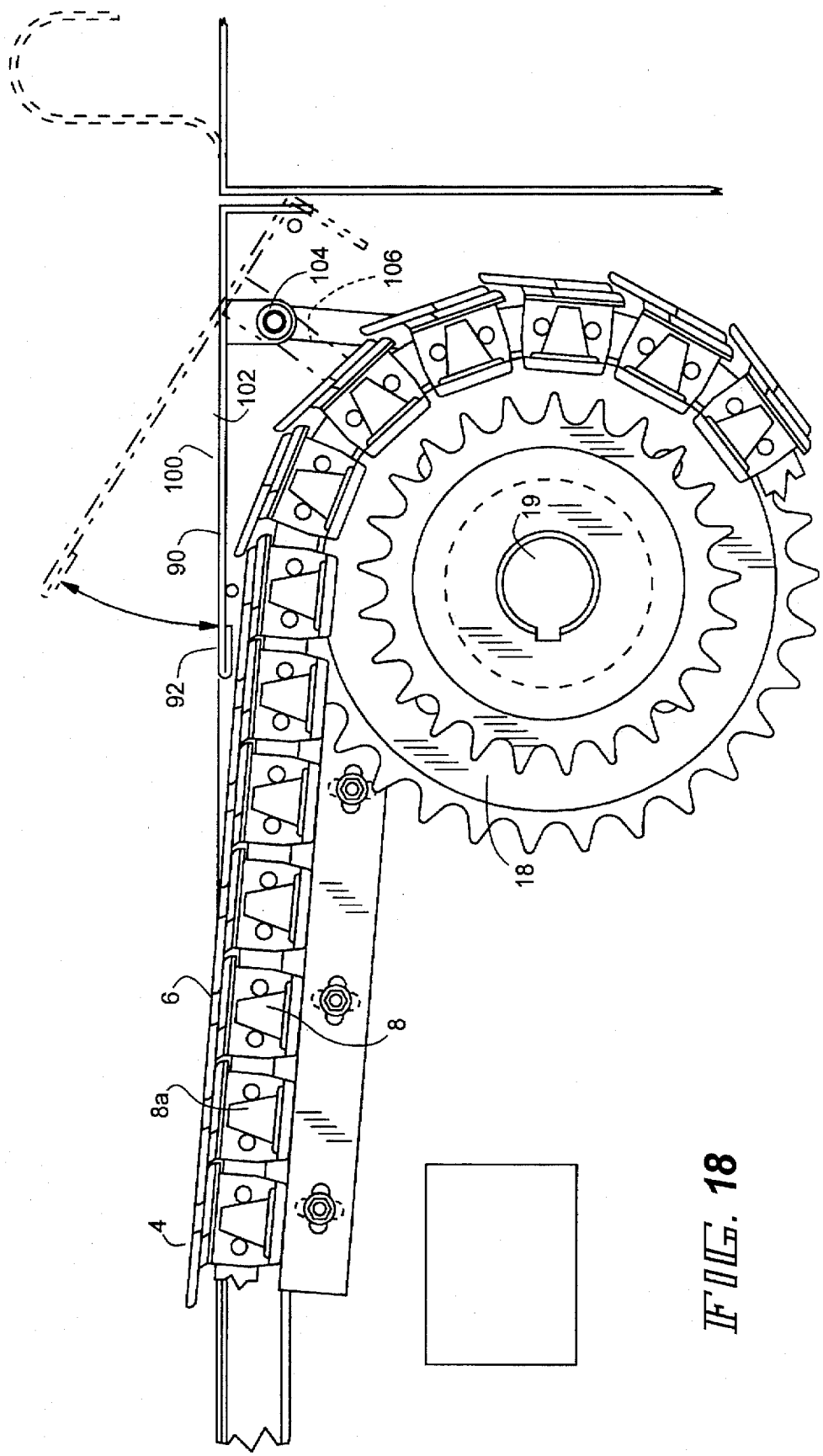
FIG. 18 is a partial side elevational view of the anti-jam means device at the slider bed entrance of the conveyor system of FIG. 1 where articulation is not exposed.
Figure 18A:
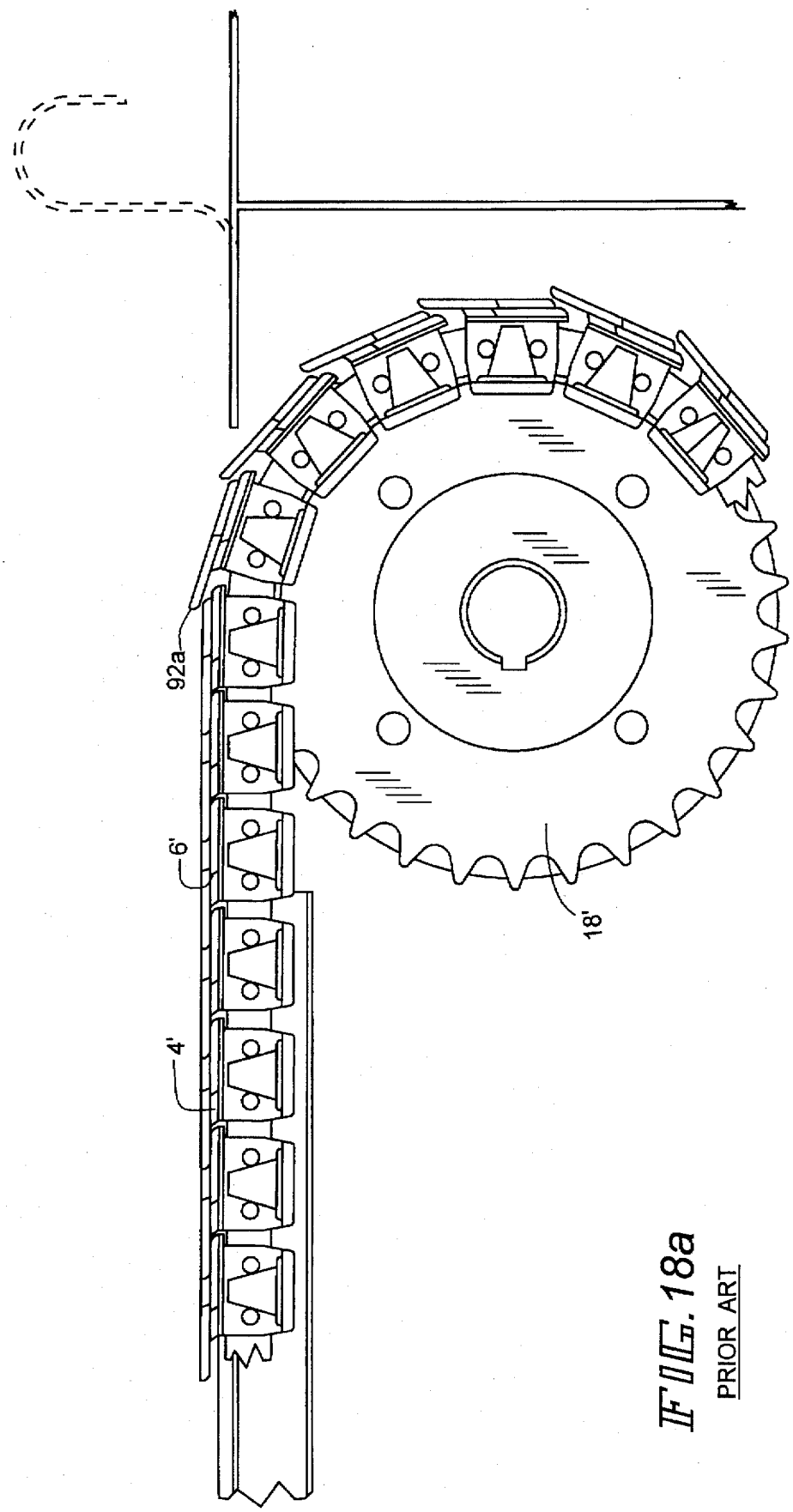
FIG. 18a is a partial side elevational view of a prior art slider bed entrance of a conveyor system.
Figure 19:
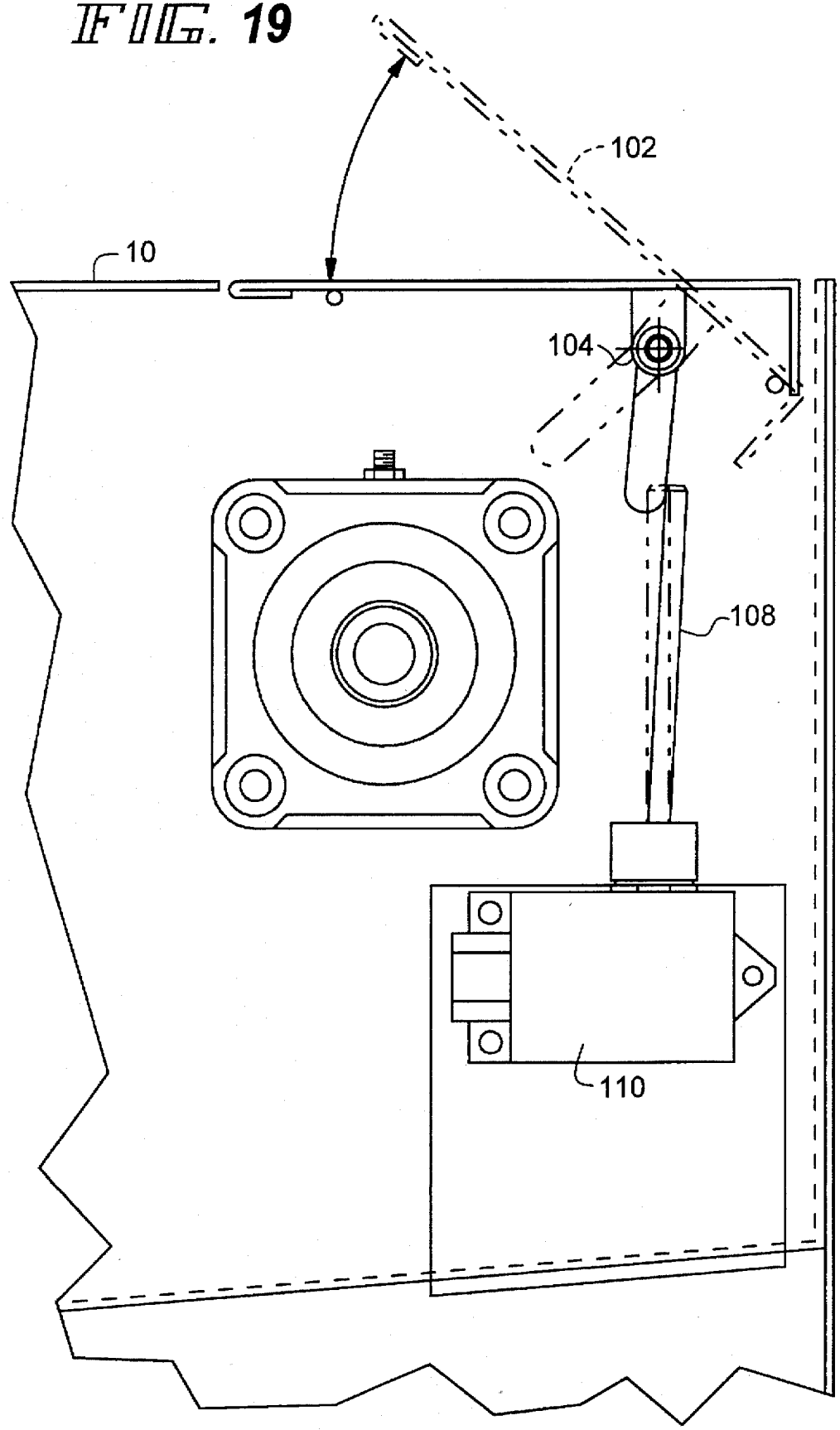
FIG. 19 is a partial side elevational view, with parts removed, of the anti-jam means device of FIG. 18 in operative relationship with the micro switch of the control circuit of the conveyor system of FIG. 1.
Figure 22:
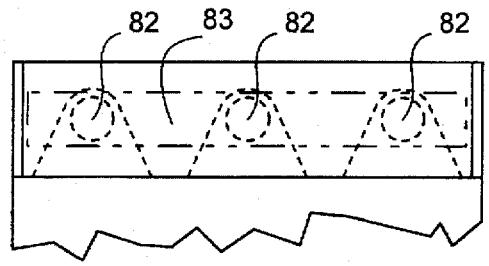
FIG. 22 is an enlarged elevational view of the three flush nozzles and manifold in the drip pan of FIG. 20.
Figure 20:
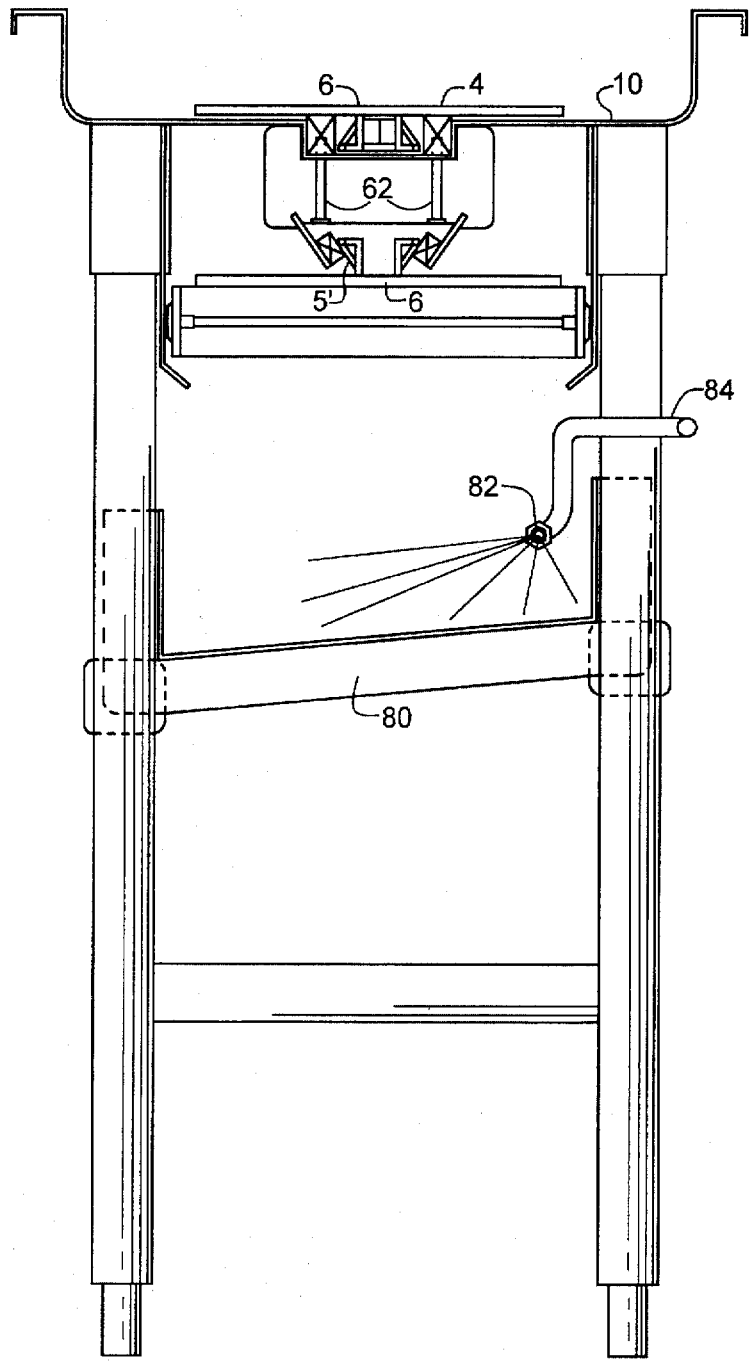
FIG. 20 is a partial end elevational view of the conveyor system with drip pan, with parts in section, taken along lines 20—20 of FIG. 1.

As seen in FIGS. 18 and 19, the conveyor system 2 includes a low profile slider bed entrance 90 in which the portion 92 of the slider bed 10 covers the slats 6 as they articulate or open away at the driven sprocket 16. As seen in FIG. 18a, prior art articulating slats are exposed from above at area 92a without an enclosure or cover over which they open away from the sprocket. Such an area of articulation is hazardous to personal and small objects may be caught. In FIGS. 18 and 19 showing the invention, the covering portion 92 is covered by a section of the slider bed 10 or the anti-jam mechanism to be described. By covering the articulating slats, the likelihood of fingers, silverware and other small objects getting caught is reduced. An anti-jam mechanism 100 is also provided at the slider bed entrance and acts immediately to disrupt operation of the conveyor system 2 if small objects are caught. Although the anti-jam mechanism 100 is shown in FIG. 18 where portion 92 of the slider bed covers the articulating slats; it is within the scope of the invention to use the anti-jam mechanism 100 when the slats articulate and are uncovered as illustrated in FIG. 18a. The anti-jam mechanism 100 includes a pivotal plate 102 mounted for pivotal movement about shaft 104. A lever 106 is affixed to the plate 102 and acts to contact an actuator 108 of an electrical micro-switch (FIG. 19). The micro-switch 110 is operatively connected to the electrical control circuit (not shown) of motor 12 of the conveyor system 2. The plate 102 is selected to be of a length so that it is not pivoted upwards when larger items, such as racks, trays, plates and the like, are being conveyed. However, as smaller items, such as silverware, are contacted, the leading edge of the plate 102 engages the item and the plate 102 is moved upward to terminate operation of the system. Thus, jamups caused by smaller items getting caught in the slider bed entrance are alleviated without damage to the equipment. In FIG. 19, a magnetic bar 102a is fastened to the pivot plate 102 to engage silverware and prevent it from falling into the wash tank.

In FIG. 2, the detergent tank 100 and detergent pump 103 respectively in housing 104 and 106 for the slider bed flush are shown mounted remote from housing for easier service. The pump 102 delivers detergent to fluid conduits (not shown) added to the water to be delivered to the nozzle 68. The drive motor 12 and associated drive element as well as water tank 72 are mounted with one side accessibility in housing 14.

What is claimed is:

1. A conveyor system for conveying articles of varying sizes comprising endless belt means movable between first and second positions respectively along an upper conveyor path for carrying the articles of various configurations and a lower return path, said second position being located adjacent the transition between said upper conveyor path and said lower return path, drive means for moving said endless belt, detection means mounted adjacent said second position at a position beyond said upper conveyor path, said detection means being coupled to said drive means and being responsive to articles smaller than a predetermined size to terminate movement of said endless belt drive for preventing jams at said second position, said detection means includes a unitary detection element extending substantially the width of the conveyor path and said detection element being mounted for movement upon contact with an article of predetermined size.

2. The conveyor system according to claim 1 wherein said detection element is pivotally mounted adjacent said second position about a horizontal axis, said detection element being caused to move from a generally horizontal orientation to a generally upright position when said detection element contacts the article of predetermined size.

3. The conveyor system according to claim 2 wherein said detection means includes switch means coupled to said drive means to cease movement of said endless belt means.

4. The conveyor system according to claim 2 wherein said drive means incudes a rotatably mounted sprocket, said endless belt having slats having lower means engaging said sprocket adjacent in an area of articulation at which said slats are separated from said sprocket, said detection element covering said area.

5. A conveyor system comprising endless belt means movable between first and second positions respectively along an upper conveyor path and a lower return path, said second position being located adjacent the transition between said upper conveyor path and said lower return path, drive means for moving said endless belt, detection means mounted adjacent said second position beyond said conveyor path, said detection means being coupled to said drive means and being responsive to articles smaller than a predetermined size to terminate movement of said endless belt drive for preventing jams at said second position, said detection means includes a detection element mounted for movement upon contact with an article of predetermined size, wherein said detection element includes a magnet for engaging metallic elements.

6. A conveyor system comprising endless belt means movable between first and second positions respectively along an upper conveyor path and a lower return path, said second position being located adjacent the transition between said upper conveyor path and said lower return path, drive means for moving said endless belt, detection means mounted adjacent said second position beyond said conveyor path, said detection means being coupled to said drive means and being responsive to articles smaller than a predetermined size to terminate movement of said endless belt drive for preventing jams at said second position, said detection means includes a detection element mounted for movement upon contact with an article of predetermined size, said detection means having means for retaining an article smaller than predetermined size from dropping downward.

7. The conveyor system according to claim 6 wherein said means for retaining an object includes a projecting bar.

8. The conveyor according to claim 6 wherein said bar is a magnet.

* * * * *